(12) United States Patent
Ferris

(10) Patent No.: US 8,081,395 B1
(45) Date of Patent: Dec. 20, 2011

(54) CONTINUOUS DIGITAL OFFSET CANCELLATION

(75) Inventor: Timothy A. Ferris, Mission Viejo, CA (US)

(73) Assignee: Western Digital Technologies, Inc., Irvine, CA (US)

(*) Notice: Subject to any disclaimer, the term of this patent is extended or adjusted under 35 U.S.C. 154(b) by 36 days.

(21) Appl. No.: 12/638,858

(22) Filed: Dec. 15, 2009

(51) Int. Cl.
G11B 5/09 (2006.01)
G11B 15/18 (2006.01)
G11B 21/02 (2006.01)

(52) U.S. Cl. .............. 360/39; 360/69; 360/75
(58) Field of Classification Search .................. None
See application file for complete search history.

(56) References Cited

U.S. PATENT DOCUMENTS

| | | | |
|---|---|---|---|
| 4,356,450 A | 10/1982 | Masuda | |
| 4,969,059 A * | 11/1990 | Volz et al. | 360/78.04 |
| 5,442,492 A * | 8/1995 | Cunningham et al. | 360/46 |
| 5,546,433 A * | 8/1996 | Tran et al. | 375/376 |
| 5,892,540 A | 4/1999 | Kozlowski et al. | |
| 5,986,845 A * | 11/1999 | Yamaguchi et al. | 360/75 |
| 6,069,866 A | 5/2000 | Pietruszynski et al. | |
| 6,141,169 A | 10/2000 | Pietruszynski et al. | |
| 6,194,941 B1 | 2/2001 | Zarabadi et al. | |
| 6,262,619 B1 * | 7/2001 | McGreer et al. | 327/307 |
| 6,396,308 B1 | 5/2002 | Bosnyak et al. | |
| 6,459,335 B1 | 10/2002 | Darmawaskita et al. | |
| 6,538,490 B2 * | 3/2003 | Yoshizawa | 327/307 |
| 6,590,805 B2 | 7/2003 | Lu et al. | |
| 6,661,590 B2 * | 12/2003 | Cyrusian et al. | 360/32 |
| 6,690,525 B2 * | 2/2004 | Ruegg et al. | 360/51 |
| 6,844,775 B2 | 1/2005 | Doorenbos et al. | |
| 6,914,743 B1 * | 7/2005 | Narayana et al. | 360/77.08 |
| 6,952,318 B1 * | 10/2005 | Ngo | 360/69 |
| 7,215,632 B2 * | 5/2007 | Horibe | 369/124.11 |
| 7,348,808 B2 | 3/2008 | Moussavi | |
| 7,804,432 B2 * | 9/2010 | Fukuzawa et al. | 341/118 |

* cited by examiner

Primary Examiner — K. Wong

(57) ABSTRACT

A disk drive is disclosed comprising a disk, a head for writing data to the disk, and control circuitry coupled to the head, the control circuitry comprising a signal amplifier outputting a first signal comprising an offset voltage, the control circuitry operable to determine a state signal based on comparing the first signal to a reference signal, increase a M-bit digital count value in response to a first state of the state signal, decrease the M-bit digital count value in response to a second state of the state signal, and determine a first analog signal based on N bits of the digital count value, wherein the first analog signal adjusts the offset voltage and $M>N$.

33 Claims, 4 Drawing Sheets

CONTINUOUS DIGITAL OFFSET CANCELLATION

BACKGROUND

Disk drives comprise electronic circuits that may suffer from problems associated with offset voltages. Generally speaking, this may mean that there is an error value between an input signal and an output signal in a circuit. This offset may require cancellation, as it impacts the precision of operation of the circuit as the circuit moves out of its optimal design operating point. In some cases it can also lead to improper functioning of the circuit.

Static voltage offset cancellation circuits are known in the art, however, such circuits do not adjust over time and/or prevent normal circuit operation while a re-calibration process occurs. Accordingly, what is needed is a continuous digital offset cancellation to prevent a diversion from an operating mode to a calibration mode.

BRIEF DESCRIPTION OF THE DRAWINGS

Embodiments are illustrated by way of example, and not limitation, in the figures of the accompanying drawings in which.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific electronic devices, materials, dimensions, and processes parameters etc. to provide a thorough understanding. Reference throughout this specification to "an embodiment" means that a particular feature, structure, electronic device, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, electronic devices, materials, or characteristics may be combined in any suitable manner in one or more embodiments.

Reference throughout this specification to "one embodiment," "an embodiment," or similar language means that a particular feature, structure, electronic device, or characteristic described in connection with the embodiment is included in at least one embodiment of the invention. Thus, appearances of the phrases "in one embodiment," "in an embodiment," and similar language throughout this specification may refer to separate embodiments or may all refer to the same embodiment.

Furthermore, the described features, structures, electronic devices, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other electronic devices, methods, components, materials, and so forth. In other instances, well-known electronic devices, structures, materials, or operations are not shown or described in detail to avoid obscuring aspects of the invention.

Figure 1A:
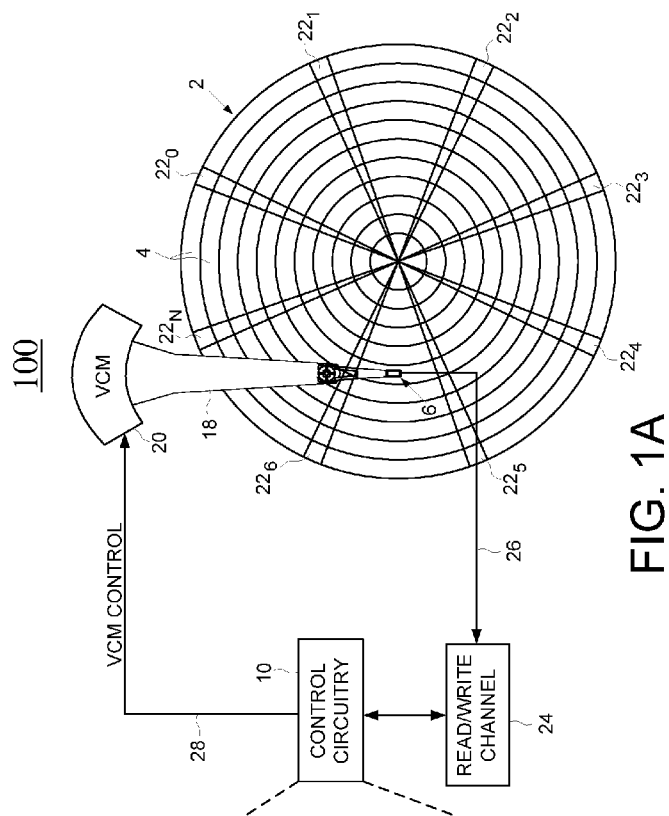
FIG. 1A shows a disk drive according to an embodiment of the present invention comprising a disk, a head actuated over the disk, and control circuitry.
Figure 1B:
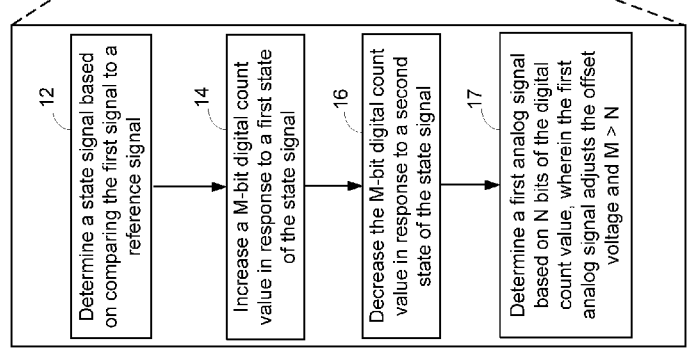
FIG. 1B is a flow diagram of acts executed by the control circuitry according to an embodiment of the present invention.

FIG. 1A shows a disk drive 100 according to an embodiment of the present invention comprising a disk 2 having a plurality of tracks 4, and a head 6 actuated over the disk 2. The disk drive further comprises control circuitry 10 which executes the flow diagram of FIG. 1B wherein at step 12 the control circuitry 10 determines a state signal based on comparing the first signal to a reference signal. At step 14 the control circuitry 10 increases a M-bit digital count value in response to a first state of the state signal, at step 16 the control circuitry 10 decreases the M-bit digital count value in response to a second state of the state signal, and at step 17 the control circuitry 10 determines a first analog signal based on N bits of the digital count value, wherein the first analog signal adjusts the offset voltage and M>N.

Any suitable control circuitry 10 may be employed to implement the embodiments of the present invention. In one embodiment, the control circuitry 10 comprises a microprocessor executing instructions, the instructions being operable to cause the microprocessor to perform the steps of FIG. 1B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 10 comprises suitable logic circuitry, such as state machine circuitry.

In the embodiment of FIG. 1A, the head 6 is connected to a distal end of an actuator arm 18 which is rotated about a pivot by a voice coil motor (VCM) 20 in order to actuate the head 6 radially over the disk 2. The VCM 20 comprises a voice coil which, when energized with current by the control circuitry 10, generates a magnetic flux which interacts with the magnetic flux from permanent magnets to generate a torque that rotates the actuator arm 18 about the pivot. Also in the embodiment of FIG. 1A, the disk 2 comprises a plurality of embedded servo sectors $22_0$-$22_N$ each comprising coarse head position information, such as a track address, and fine head position information, such as servo bursts. As the head 6 passes over each servo sector, a read/write channel 24 processes the read signal 26 emanating from the head 6 to demodulate the position information. The control circuitry 10 processes the position information to generate a control signal 28 applied to a voice coil motor (VCM) 20. The VCM 20 rotates the actuator arm 18 in order to position the head 6 over a target track during the seek operation, and maintains the head 6 over the target track during a tracking operation.

Figure 2:
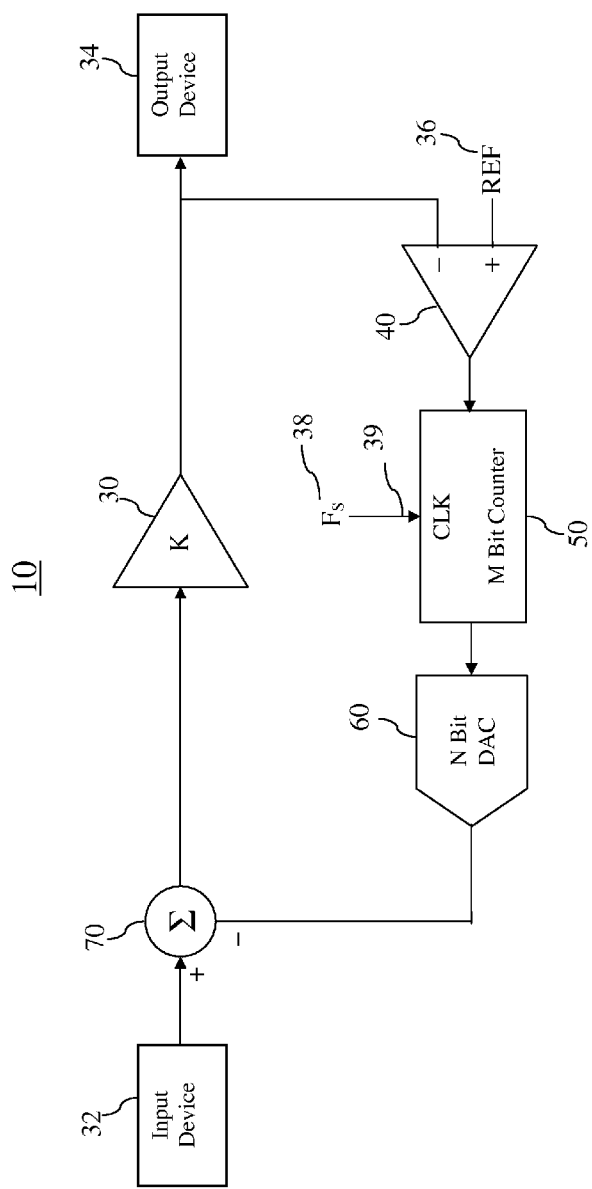
FIG. 2 illustrates is a schematic diagram illustrating the control circuitry according to an embodiment of the present invention.

FIG. 2 illustrates the control circuitry 10 according to one embodiment of the present invention. The control circuitry 10 comprises a signal amplifier 30, an input device 32, an output device 34, a comparator 40, an M-bit counter 50, an N-bit digital-to-analog converter (DAC) 60, and a combiner 70.

The signal amplifier 30 receives an input signal from input device 32 via combiner 70 at a first input and provides an amplified first signal comprising an offset voltage to the output device 34. The first signal comprising the offset voltage is also provided by the signal amplifier 30 to an input of the comparator 40.

The comparator 40 compares the first signal to a reference signal 46 and outputs a state signal having a first state if the first signal is greater than the reference signal 46. The comparator 40 outputs the state signal having a second state if the first signal is less than or equal to the reference signal 46. In one embodiment of the invention, the reference signal establishes a voltage offset/bias level for the control circuitry 10. The reference signal may be approximately 1 volt according to one embodiment of the invention, however, any suitable reference signal level may be used as well.

The state signal from the comparator 40 is then provided to the input of the M-bit counter 50. The M-bit counter 50 is responsive to the state signal to update an M-bit digital count value according to a clock signal 38 of frequency $F_s$ hertz (Hz) received at a clock input 39. The M-bit counter 50 increases the M-bit digital count value in response to the first state and decreases the M-bit digital count value in response to the second state. In one embodiment, the clock signal 38 frequency $F_s$ (sampling frequency) is selected to be high enough to oversample and avoid potential aliasing issues.

The M-bit counter 50 outputs the N most significant bits (MSB) of the M-bit digital count value to the N-bit digital-to-analog converter (DAC) 60, where M>N bits. The DAC converts the N-bit digital count value to a first analog signal and provides the first analog signal to combiner 70. In one embodiment, the DAC 60 output voltage step size equals $V_{DAC}/2^N$ wherein $V_{DAC}$ is a voltage range of the N-bit DAC.

In this embodiment of the invention, the combiner 70 subtracts the first analog signal from the input signal output from the input device 32 and provides the difference signal to the first input of the signal amplifier 30 to adjust the offset voltage.

Figure 3:
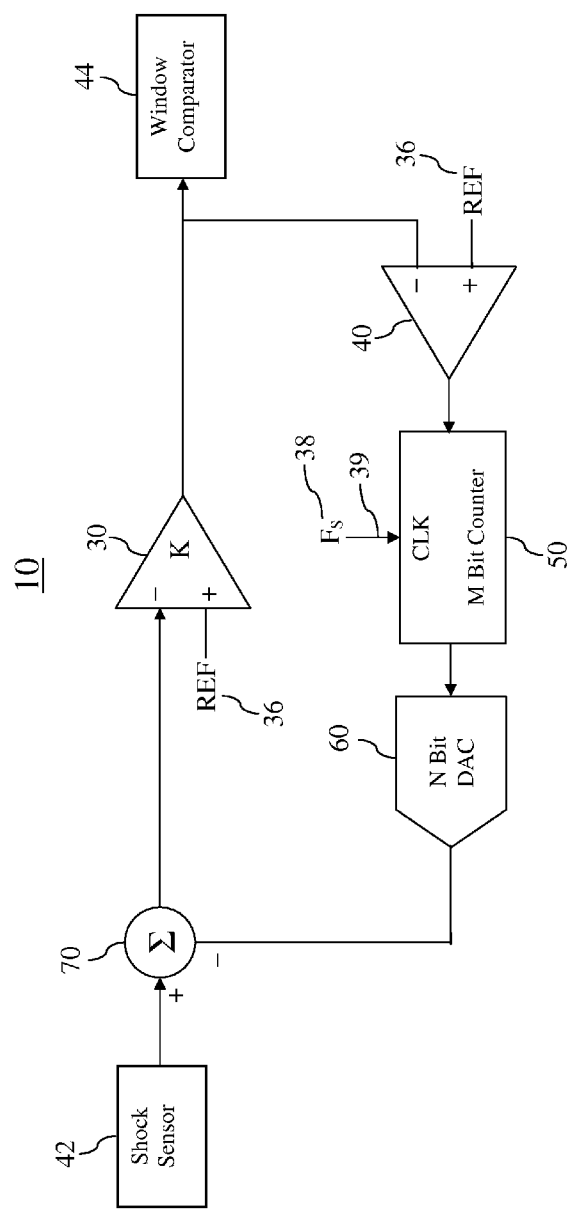
FIG. 3 illustrates is a schematic diagram illustrating the control circuitry according to another embodiment of the present invention.

In another embodiment, the signal amplifier 30 receives the difference signal at an inverting input and receives the reference signal 36 at a non-inverting input (see FIG. 3). However, any configuration of an adding or subtracting combiner in conjunction with inverting and non-inverting inputs to the signal amplifier that results in adjusting the offset voltage may be used as well.

In some embodiments of the invention, the control circuitry 10 is operable to continuously adjust the offset voltage. The continuous voltage offset correction is provided from a frequency range of 0 Hz to $F_s/2^{(M-N)}$ Hz. The voltage offset correction frequency response is determined by the M-bit counter 50 updating the M-bit digital count value according to the clock signal of frequency $F_s$ and supplying the N most significant bits (MSB) of the M-bit digital count value to the N-bit DAC 60. The M–N bits of decimation produce the equivalent of a low pass filter in the feedback path and a high pass filter in the feedforward path. In either case, a pole in the frequency response occurs at a frequency of $F_s/2^{(M-N)}$. In the case of the feedback path, the M–N bits of decimation shifts the pole down in frequency and away from the clock sampling frequency Fs. In the case of the feedforward path, the M–N bits of decimation forms a zero at zero Hz and a pole at $F_s/2^{(M-N)}$ to filter out the low frequency components of the voltage offset.

FIG. 3 illustrates the control circuitry 10 according to another embodiment of the present invention. In this embodiment of the invention, the control circuitry 10 may be used in the disk drive 100 to determine a shock event. In this embodiment the input device 32 may comprise a shock sensor 42 having a piezoelectric transducer (PZT) with a resonant frequency of 90 kHz. A shock signal produced by the shock sensor may be input to the inverting first input of the signal amplifier 30. The output device 34 may comprise a window comparator 44 coupled to the signal amplifier 30 to produce a shock interrupt signal. A reference signal 36 of approximately 0.9 volts may be applied to a non-inverting reference input of the signal amplifier 30 and the non-inverting reference input of the comparator 40.

In one embodiment, the voltage offset correction feedback path may comprise a 23-bit counter 50 updating a 23-bit digital count value according to a clock signal of frequency $F_s$=250 kHz and supplying 12 most significant bits (MSB) of the 23-bit digital count value to a 12-bit DAC 60. The 23−12=11 bits of decimation produce the equivalent of a low pass filter in the feedback path and a high pass filter in the feedforward path. In either case, a pole in the frequency response occurs at a frequency of $250 \text{ kHz}/2^{(23-12)}$=125 Hz. Thus, the feedback path allows correction of signals from 0 Hz up to approximately 125 Hz, while the feedforward path blocks signals below 125 Hz. Thus, low frequency offset voltages up to 125 Hz may be corrected and shock signals having a minimum frequency of 250 Hz and above may be detected by this embodiment of the invention. This may prevent false shock detections due to detecting the offset voltage rather than actual shock events.

In one embodiment, the DAC output voltage step size equals $V_{DAC}/2^N$ wherein $V_{DAC}$ is a voltage range of the N-bit DAC. In this embodiment, the DAC 60 may be coupled to two power supplies supplying +110 millivolts (mV) and −110 millivolts (mV) for a voltage range of 220 mV. The DAC output voltage step size equals $220 \text{ mV}/2^{12}$=approximately 54 microvolts. Thus, the first analog signal adjusts the offset voltage in approximately 50 microvolt increments.

Alternative embodiments incorporating the control circuitry 10 may be utilized for various disk drive applications wherein the input device may comprise, for example, a pressure sensor for pressure measurements, a rotational accelerometer sensor for rotational acceleration feedforword (RAF), or a back EMF sensor in a VCM for use in a load/unload loop.

Figure 4:
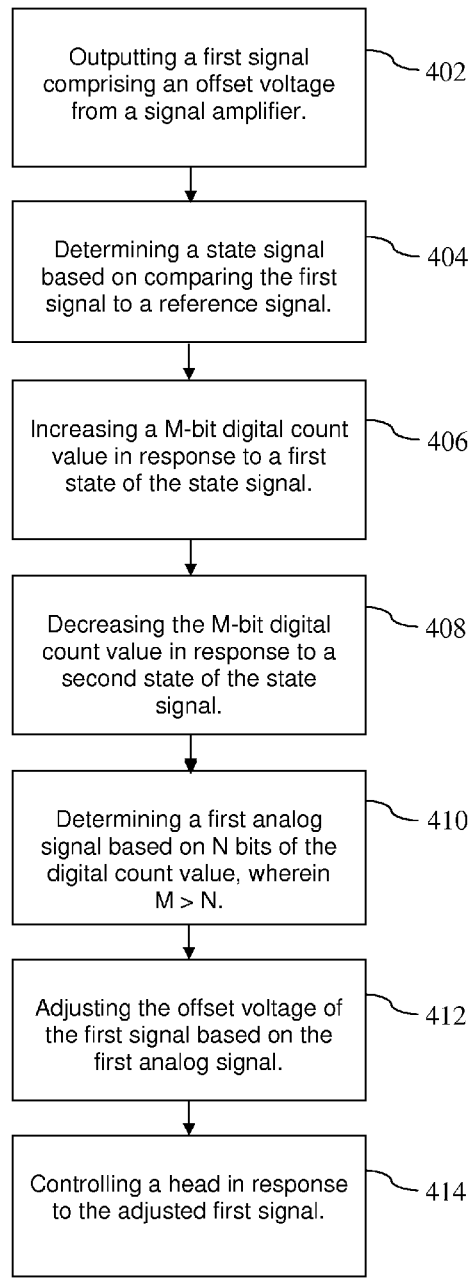
FIG. 4 is a block diagram illustrating a method for correcting an offset in a disk drive in accordance with an embodiment of the invention.

FIG. 4 is a block diagram illustrating a method for of correcting an offset in a disk drive in accordance with an embodiment of the invention. The method comprises outputting a first signal comprising an offset voltage from a signal amplifier (act 402), determining a state signal based on comparing the first signal to a reference signal (act 404), increasing a M-bit digital count value in response to a first state of the state signal (act 406), decreasing the M-bit digital count value in response to a second state of the state signal (act 408), determining a first analog signal based on N bits of the digital count value, wherein M>N (act 410), adjusting the offset voltage of the first signal based on the first analog signal (act 412), and controlling a head in response to the adjusted first signal (act 414).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. A disk drive comprising:
   a disk;
   a head for writing data to the disk; and
   control circuitry coupled to the head, the control circuitry comprising a signal amplifier outputting a first signal comprising an offset voltage, the control circuitry operable to:
   determine a state signal based on comparing the first signal to a reference signal;
   increase a M-bit digital count value in response to a first state of the state signal;
   decrease the M-bit digital count value in response to a second state of the state signal; and
   determine a first analog signal based on N bits of the digital count value, wherein the first analog signal adjusts the offset voltage and M>N.

2. The disk drive of claim 1, wherein the control circuitry comprises a comparator coupled to the signal amplifier and the reference signal to determine the state signal.

3. The disk drive of claim 2, wherein the comparator outputs the first state when the first signal is greater than the reference signal.

4. The disk drive of claim 1, wherein the control circuitry comprises an M-bit counter responsive to the state signal to update the M-bit digital count value according to a clock signal received at a clock input.

5. The disk drive of claim 4, wherein the M-bit counter increases the M-bit digital count value in response to the first state and decreases the M-bit digital count value in response to the second state.

6. The disk drive of claim 5, wherein the control circuitry comprises an N-bit digital-to-analog converter (DAC) coupled to the M-bit counter.

7. The disk drive of claim 6, wherein the clock signal comprises a frequency $F_s$ and the voltage offset correction is provided from a frequency range of 0 Hz to $F_s/2^{(M-N)}$ Hz.

8. The disk drive of claim 6, wherein a DAC output voltage step size equals $V_{DAC}/2^N$ wherein $V_{DAC}$ is a voltage range of the N-bit DAC.

9. The disk drive of claim 6, wherein the M-bit counter outputs N most significant bits (MSB) to the N-bit DAC.

10. The disk drive of claim 1, wherein the signal amplifier comprises a first input and the control circuitry comprises a combining junction coupled to an input signal, the first analog signal, and the first input.

11. The disk drive of claim 10, wherein the combining junction subtracts the first analog signal from the input signal.

12. The disk drive of claim 1, wherein the control circuitry further comprises a shock sensor coupled to the signal amplifier.

13. The disk drive of claim 12, wherein the control circuitry further comprises a window comparator coupled to the signal amplifier to produce a shock interrupt signal.

14. The disk drive of claim 1, wherein the control circuitry further comprises a pressure sensor coupled to the signal amplifier.

15. The disk drive of claim 1, wherein the control circuitry is coupled to a voice coil motor (VCM) to measure a back electro-motive force (EMF).

16. The disk drive of claim 1, wherein the control circuitry further comprises a rotational accelerometer sensor coupled to the signal amplifier.

17. The disk drive of claim 1, wherein the offset voltage comprises a DC offset voltage.

18. The disk drive of claim 1, wherein the control circuitry is further operable to continuously adjust the offset voltage.

19. A method of correcting an offset in a disk drive, comprising:
   outputting a first signal comprising an offset voltage from a signal amplifier;
   determining a state signal based on comparing the first signal to a reference signal;
   increasing a M-bit digital count value in response to a first state of the state signal;
   decreasing the M-bit digital count value in response to a second state of the state signal;
   determining a first analog signal based on N bits of the digital count value, wherein M>N;
   adjusting the offset voltage of the first signal based on the first analog signal; and
   controlling a head in response to the adjusted first signal.

20. The method of claim 19, wherein determining the state signal based on comparing the first signal to the reference signal comprises determining the state signal based on an output of a comparator coupled to the signal amplifier and the reference signal.

21. The method of claim 20, wherein the comparator outputs the first state when the first signal is greater than the reference signal.

22. The method of claim 19, wherein the M-bit digital count value is output by an M-bit counter responsive to the state signal and a clock signal received at a clock input.

23. The method of claim 22, wherein the M-bit counter increases the M-bit digital count value in response to the first state and decreases the M-bit digital count value in response to the second state.

24. The method of claim 23, wherein determining the first analog signal based on N bits of the digital count value comprises inputting N bits of the digital count value into an N-bit digital-to-analog converter (DAC).

25. The method of claim 24, wherein the clock signal comprises a frequency $F_s$ and the voltage offset correction is provided from a frequency range of 0 Hz to $F_s/2^{(M-N)}$ Hz.

26. The method of claim 24, wherein a DAC output voltage step size equals $V_{DAC}/2^N$ wherein $V_{DAC}$ is a voltage range of the N-bit DAC.

27. The method of claim 24, wherein the M-bit counter outputs N most significant bits (MSB) to the N-bit DAC.

28. The method of claim 19, further comprises combining an input signal and the first analog signal to provide to a first input to the signal amplifier.

29. The method of claim 28, further comprises subtracting the first analog signal from the input signal.

30. The method of claim 19, further comprises inputting a shock sensor signal to the signal amplifier.

31. The method of claim 30, further comprises determining a shock interrupt signal based on a window comparator and the first signal.

32. The method of claim 19, wherein the offset voltage comprises a DC offset voltage.

33. The method of claim 19, further comprising continuously adjusting the offset voltage.

* * * * *